US009809200B2

(12) United States Patent
Bex et al.

(10) Patent No.: US 9,809,200 B2
(45) Date of Patent: Nov. 7, 2017

(54) WIPING DEVICE, IN PARTICULAR WIPING DEVICE FOR A MOTOR VEHICLE PANE

(75) Inventors: Koen Bex, Jeuk/Limburg Belgien (BE); Helmut Depondt, Kessel-Lo (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 14/129,327

(22) PCT Filed: Jun. 1, 2012

(86) PCT No.: PCT/EP2012/060328
§ 371 (c)(1),
(2), (4) Date: Dec. 26, 2013

(87) PCT Pub. No.: WO2013/000657
PCT Pub. Date: Jan. 3, 2013

(65) Prior Publication Data
US 2014/0143972 A1    May 29, 2014

(30) Foreign Application Priority Data
Jun. 28, 2011    (DE) .......................... 10 2011 078 178

(51) Int. Cl.
*B60S 1/38* (2006.01)
(52) U.S. Cl.
CPC ............. *B60S 1/381* (2013.01); *B60S 1/3881* (2013.01)
(58) Field of Classification Search
CPC ............................... B60S 1/381; B60S 1/3881
USPC .................................................... 15/250.201
See application file for complete search history.

(56) References Cited

U.S. PATENT DOCUMENTS

| 7,228,588 | B2* | 6/2007 | Kraemer | B60S 1/381 15/250.201 |
| 7,503,095 | B2* | 3/2009 | Lin | B60S 1/381 15/250.201 |
| 7,540,061 | B1* | 6/2009 | Huang | B60S 1/3881 15/250.201 |
| 2003/0159229 | A1* | 8/2003 | Weiler | B60S 1/381 15/250.201 |

(Continued)

FOREIGN PATENT DOCUMENTS

| CN | 1692045 | 11/2005 |
| CN | 101618710 | 1/2010 |

(Continued)

OTHER PUBLICATIONS

WO2009065821A1 (machine translation), 2009.*
International Search Report for Application No. PCT/EP2012/060328 dated Jul. 16, 2012 (2 pages).

*Primary Examiner* — Andrew A Horton
(74) *Attorney, Agent, or Firm* — Michael Best & Friedrich LLP (57) ABSTRACT

The invention relates to a wiping device, in particular a wiping device for a motor vehicle pane, comprising a retaining unit (10a-10e) that has a retaining element (12a-12e) with a longitudinal guide channel (14a-14e) for guiding a spring element (16a-16e), and comprising a spoiler unit (22a-22e). According to the invention, the retaining element (12a-12e) has at least one fixing means (18a-18e, 20a-20e), the free end (24a-24e, 26a-26e) of which faces the longitudinal guide channel (14a-14e) and which is provided to interlock with the spoiler unit (22a-22e).

16 Claims, 5 Drawing Sheets

(56) References Cited

U.S. PATENT DOCUMENTS

| | | | |
|---|---|---|---|
| 2004/0111820 A1* | 6/2004 | Aoyama | B60S 1/381 15/250.201 |
| 2006/0156529 A1 | 7/2006 | Thomar et al. | |
| 2007/0174989 A1 | 8/2007 | Moll et al. | |
| 2008/0052865 A1* | 3/2008 | Chiang | B60S 1/38 15/250.43 |
| 2008/0201894 A1* | 8/2008 | Ko | B60S 1/3858 15/250.201 |
| 2009/0089956 A1* | 4/2009 | De Block | B60S 1/3881 15/250.201 |
| 2010/0037417 A1* | 2/2010 | Moll | B60S 1/38 15/250.201 |
| 2010/0064468 A1* | 3/2010 | Kang | B60S 1/381 15/250.48 |
| 2010/0218333 A1* | 9/2010 | Ritt | B60S 1/3877 15/250.201 |
| 2011/0107541 A1* | 5/2011 | Caillot | B60S 1/3862 15/250.04 |

FOREIGN PATENT DOCUMENTS

| | | | |
|---|---|---|---|
| DE | 102006020524 | 11/2007 | |
| FR | WO 2009065821 A1 * | 5/2009 | B60S 1/381 |
| JP | S55153255 | 11/1980 | |
| RU | 80414 | 2/2009 | |
| RU | 2363602 | 8/2009 | |
| WO | 2009092669 | 7/2009 | |

* cited by examiner

WIPING DEVICE, IN PARTICULAR WIPING DEVICE FOR A MOTOR VEHICLE PANE

BACKGROUND OF THE INVENTION

A wiping device, in particular a wiping device for a motor vehicle pane, comprising a retaining unit which has a retaining element with a longitudinal guide channel for guiding a spring element, and comprising a spoiler unit is already known.

SUMMARY OF THE INVENTION

The invention is based on a wiping device, in particular a wiping device for a motor vehicle pane, comprising a retaining unit which has a retaining element with a longitudinal guide channel for guiding a spring element, and comprising a spoiler unit.

It is proposed that the retaining element has at least one fastening means which, with a free end, faces the longitudinal guide channel and is provided for forming an interlocking connection with the spoiler unit, as a result of which the wiping device can be formed particularly stably. A "retaining unit" in this context is to be understood as meaning, in particular, a unit which his provided for connecting the spoiler unit to a wiper strip. A "wiper strip" in this context is to be understood as meaning, in particular, a strip which is provided for wiping a vehicle pane. The wiper strip is preferably formed from a rubber material. A "retaining element" in this context is to be understood as meaning, in particular, an element which is provided for connecting a spoiler unit, a spring element and a wiper strip in an interlocking manner. A "longitudinal guide channel" in this context is to be understood as meaning, in particular, a guide channel which extends parallel to a longitudinal direction of the retaining unit. The longitudinal guide channel preferably comprises a clearance and at least one channel wall bounding the clearance. A "longitudinal direction" in this context is to be understood as meaning, in particular, a direction which extends substantially parallel to a longitudinal extent of the retaining element. A "longitudinal extent" in this context is to be understood as meaning, in particular, a greatest possible extent. "Substantially" in this context is to be understood as meaning, in particular, a deviation of less than 10°, preferably less than 5°. An "extent" of an element in this context is to be understood as meaning, in particular, a maximum distance between two points of a perpendicular projection of the element onto a plane. A "spring element" in this context is to be understood as meaning, in particular, a spring-elastic element which has at least one extent which, in a normal operating state, is elastically changeable by at least 10%, in particular by at least 20%, preferably by at least 30% and particularly advantageously by at least 50%, and which, in particular, produces a counterforce which is dependent on a change in the extent and is preferably proportional to the change and opposes the change. A "fastening means" in this context is to be understood as meaning, in particular, a means which is provided for forming an interlocking connection with a corresponding component. "Provided" is to be understood as meaning, in particular, specially designed and/or equipped.

In a further refinement of the invention, it is proposed that the retaining element has at least one channel wall which is provided for transmitting press-on forces of the spoiler unit to the retaining unit, as a result of which the wiping device can be designed in a particularly stable and load-bearing manner. A "channel wall" in this context is to be understood as meaning, in particular, a wall which borders the longitudinal guide channel.

Furthermore, it is proposed that the spoiler unit is produced in a coextrusion process, thus enabling the spoiler unit to be produced particularly cost-effectively and the spoiler unit to obtain a high degree of strength. A "coextrusion process" in this context is to be understood as meaning, in particular, the combining of at least two different plastics melts before said melts leave a profiled nozzle.

Furthermore, it is proposed that the spoiler unit has two spoiler subelements differing in hardness, thus making it advantageously possible for weight to be reduced and strength to be increased.

Furthermore, it is proposed that the harder spoiler subelement bears in an interlocking manner against the fastening means, thus enabling a particularly stable connection to be achieved between the spoiler subelement and the retaining unit.

In a further refinement of the invention, it is proposed that the softer spoiler subelement bounds a longitudinal channel which has a pentangular cross section, thus enabling the spoiler subelement to be formed in a particularly torsion-proof manner while at the same time having a low weight. "Pentangular" in this context is to be understood as meaning a contour which has five corners. Depending on the application, the corners may also be rounded.

Furthermore, it is proposed that the softer spoiler subelement has at least one concavely formed spoiler side, thus enabling wind vortices to be avoided and/or press-on forces to be increased.

If the fastening means enclose an obtuse angle with side walls of the retaining element, air vortices can be avoided in a transition region between the retaining element and the spoiler unit. An angle of smaller than 70° is preferred. It is particularly preferred for the angle to be smaller than 65°.

BRIEF DESCRIPTION OF THE DRAWINGS

Further advantages emerge from the description below of the drawing. The drawing illustrates exemplary embodiments of the invention. The drawings, the description and the claims contain numerous features in combination. A person skilled in the art will expediently also consider the features individually and put them together to form useful further combinations. In the drawings:

DETAILED DESCRIPTION

Figure 1:
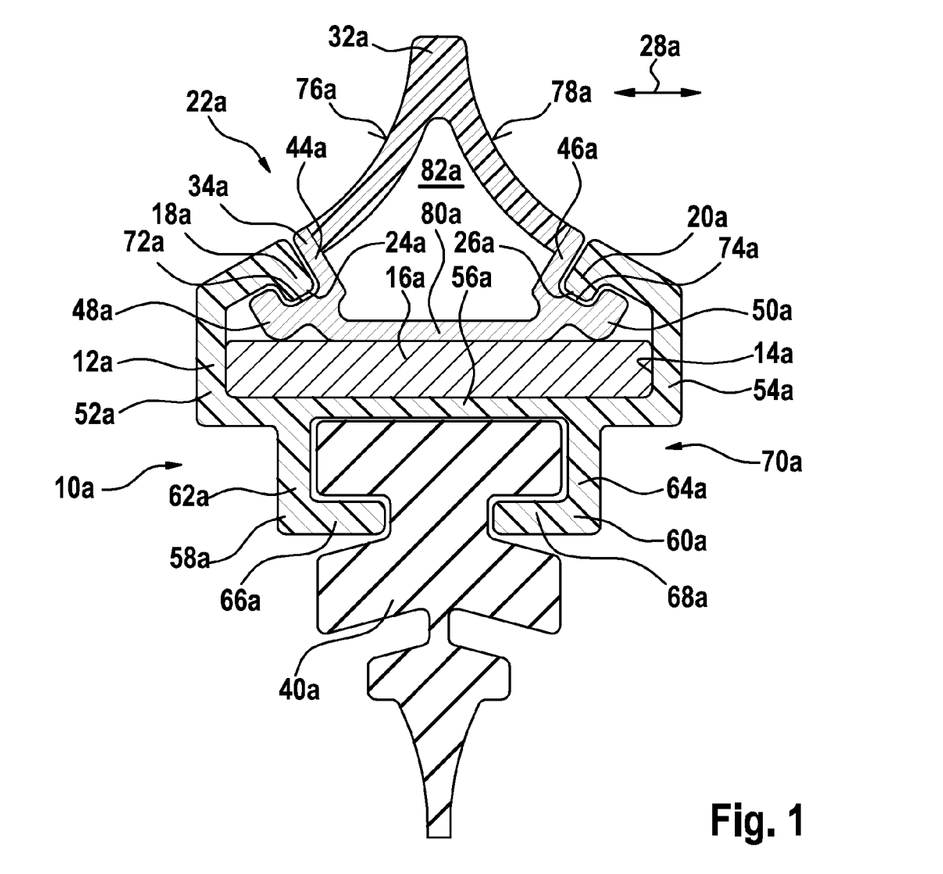
FIG. 1 shows a sectional illustration of a wiping device with a retaining unit.

FIG. 1 shows a wiping device according to the invention comprising a retaining unit 10a with a retaining element 12a which has a longitudinal guide channel 14a for guiding a spring element 16a, and a spoiler unit 22a, in a sectional illustration. The section plane runs perpendicularly to a longitudinal direction of the retaining element 12a.

In order to guide the spring element 16a, the longitudinal guide channel 14a has side walls 52a, 54a. Furthermore, an intermediate wall 56a which ends the longitudinal guide channel 14a in the direction of a wiper strip 40a is arranged on the side walls 52a, 54a. The side walls 52a, 54a extend from the intermediate wall 56a in a direction facing away from the wiper strip 40a. A respective fastening means 18a, 20a which, with a respective free end 24a, 26a, faces the longitudinal guide channel 14a is integrally formed on the side walls 52a, 54a. The fastening means 18a, 20a are of L-shaped design and border the side walls 52a, 54a at an obtuse angle of 60°.

Two L-shaped guide profiles 58a, 60a of the retaining unit 10a are arranged on the intermediate wall 56a. The guide profiles 58a, 60a are formed in one piece with the retaining element 12a. The guide profiles 58a, 60a each have a side guide 62a, 64a and each have a vertical guide 66a, 68a. The vertical guides 66a, 68a each enclose an angle of 90° with the side guides 62a, 64a. The vertical guides 66a, 68a here point towards each other. The side guides 62a, 64a each enclose an angle of 90° with respect to the intermediate wall 56a. The free ends of the guide profiles 58a, 60a point toward the vertical guides 66a, 68a in directions facing each other. The guide profiles 58a, 60a and the intermediate wall 56a form a beading rail 70a into which the wiper strip 40a is inserted.

The spoiler unit 22a is produced from two spoiler subelements 32a, 34a differing in hardness in a coextrusion process. The first spoiler subelement 32a has two outwardly concavely formed spoiler sides 76a, 78a. In order to reinforce the spoiler unit 22a, the first spoiler subelement 32a has a connecting web 80a which connects the concave spoiler sides 76a, 78a to each other. The connecting web 80a and the spoiler sides 76a, 78a bound a longitudinal channel 82a which has a substantially pentangular cross section.

The first spoiler subelement 32a is formed in one piece with the second spoiler subelement 34a and is provided for deflecting relative wind. The second spoiler subelement 34a has a higher strength and hardness than the first spoiler subelement 32a. The first spoiler subelement 32a bears against two fastening webs 44a, 46a which are formed in one piece with the connecting web 80a. The fastening webs 44a, 46a enclose an angle of 60° with the connecting web 80a. The second spoiler subelement 34a has two fastening grooves 72a, 74a which form an interlocking connection with the fastening means 18a, 20a.

The retaining element 12a is produced in a single piece from polyethylene in an extrusion process. In this context, a person skilled in the art will take various plastics appearing expedient into consideration, such as, in particular, polypropylene, polyamide, polyvinyl chloride and/or polystyrene.

The free ends 24a, 26a of the fastening means 18a, 20a are enclosed by the second spoiler subelement 34a. The harder spoiler subelement 34a here bears against the fastening means 18a, 20a in an interlocking manner. The harder spoiler subelement 34a has two supporting bodies 48a, 50a which bear against the fastening means 18a, 20a and against the spring element 16a. A connecting web 80a connects the supporting bodies 48a, 50a to each other.

The spring element 16a is embedded in the longitudinal guide channel 14a. The spring element 16a is produced from a spring steel and is provided for forming the retaining unit 10a in an elastically deflectable manner.

For assembly, the spring element 16a is first of all inserted into the longitudinal guide channel 14a. Subsequently, the wiper strip 40a is pushed into the beading rail 70a and forms an interlocking connection with the retaining element 12a.

The spoiler unit 22a is then pushed into the retaining element 12a and is then connected thereto in an interlocking manner.

FIGS. 2 to 5 show four further exemplary embodiments of the invention. The descriptions below are restricted essentially to the differences between the exemplary embodiments, wherein reference can be made to the description of the first exemplary embodiment with respect to components, features and functions which remain identical. In order to differentiate the exemplary embodiments, the letter a in the reference numbers of the exemplary embodiment in FIG. 1 is replaced by the letters b to e in the reference numbers of the exemplary embodiment of FIGS. 2 to 5. Reference can in principle also be made to the drawings and/or the description of the first exemplary embodiment with respect to identically denoted components, in particular with respect to components having the same reference numbers.

Figure 2:
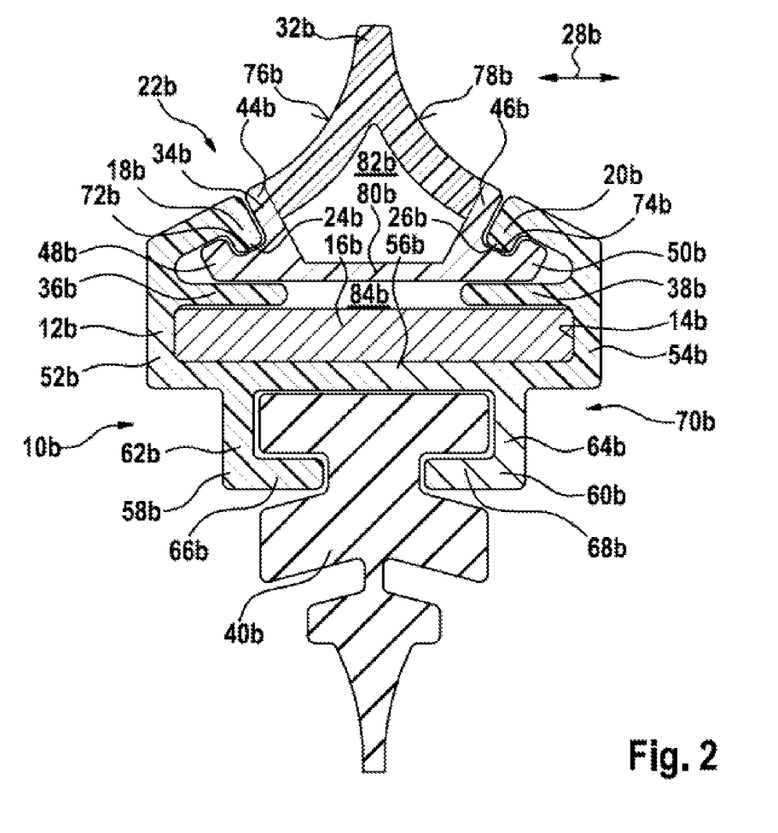
FIG. 2 shows a sectional illustration of a further exemplary embodiment of a wiping device with a retaining unit.

FIG. 2 shows a further exemplary embodiment of a wiping device according to the invention comprising a retaining unit 10b with a retaining element 12b which has a longitudinal guide channel 14b for guiding a spring element 16b, and a spoiler unit 22b, in a sectional illustration. The section plane runs perpendicularly to a longitudinal direction of the retaining element 12b. The wiping device shown substantially corresponds to the exemplary embodiment shown in FIG. 1.

The retaining element 12b has two channel walls 36b, 38b which border the longitudinal guide channel 14b. The channel walls 36b, 38b extend parallel to a wiping direction 28b and partially end the longitudinal guide channel 14b in a direction facing away from a wiper strip 40b. Furthermore, the retaining element 12b has a longitudinal opening 84b which opens the longitudinal guide channel 14b toward the spoiler unit 22b.

The spoiler unit 22b is produced from two spoiler subelements 32b, 34b differing in hardness in a coextrusion process. The first spoiler subelement 32b has two outwardly concavely formed spoiler sides 76b, 78b. In order to reinforce the spoiler unit 22b, the first spoiler subelement 32b has a connecting web 80b which connects the concave spoiler sides 76b, 78b to each other. The connecting web 80b and the spoiler sides 76b, 78b bound a longitudinal channel 82b which has a substantially pentangular cross section.

The harder spoiler subelement 34b has two supporting bodies 48b, 50b which bear against fastening means 18b, 20b and against the channel walls 36b, 38b. A connecting web 80b connects the supporting bodies 48b, 50b to each other. The connecting web 80b bears against the channel walls 36b, 38b. The first spoiler subelement 32b bears against two fastening webs 44b, 46b which are formed in one piece with the connecting web 80b. The fastening webs 44b, 46b enclose an angle of 60° with the connecting web 80b. A width of the first spoiler subelement 32b corresponds to twice the width of the fastening webs 44b, 46b.

Figure 3:
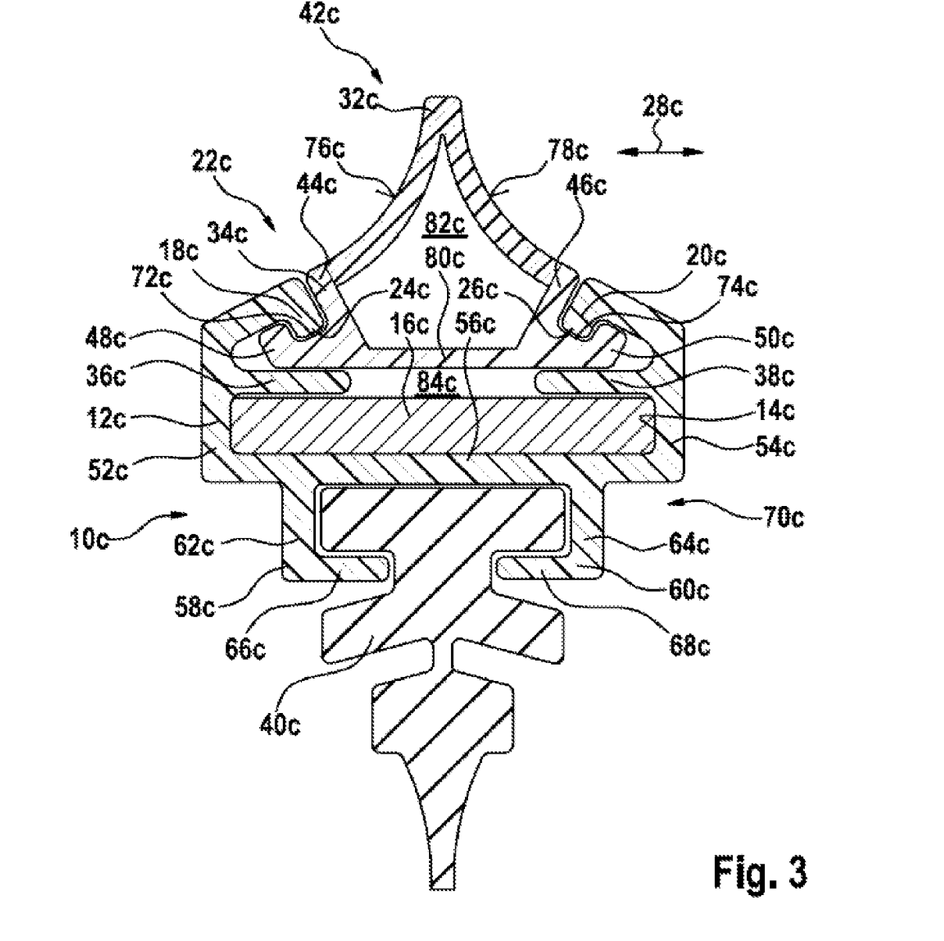
FIG. 3 shows a sectional illustration of a further exemplary embodiment of a wiping device with a retaining unit.

FIG. 3 shows a further exemplary embodiment of a wiping device according to the invention comprising a retaining unit 10c with a retaining element 12c which has a longitudinal guide channel 14c for guiding a spring element 16c, in a sectional illustration. The section plane runs perpendicularly to a longitudinal direction of the retaining element 12c. The wiping device shown corresponds substantially to the exemplary embodiment shown in FIG. 2. A width of a first spoiler subelement 32c corresponds to the width of fastening webs 44c, 46c. The first spoiler subelement 32c converges at a pointed edge in an end region 42c facing away from a wiper strip 40c.

Figure 4:
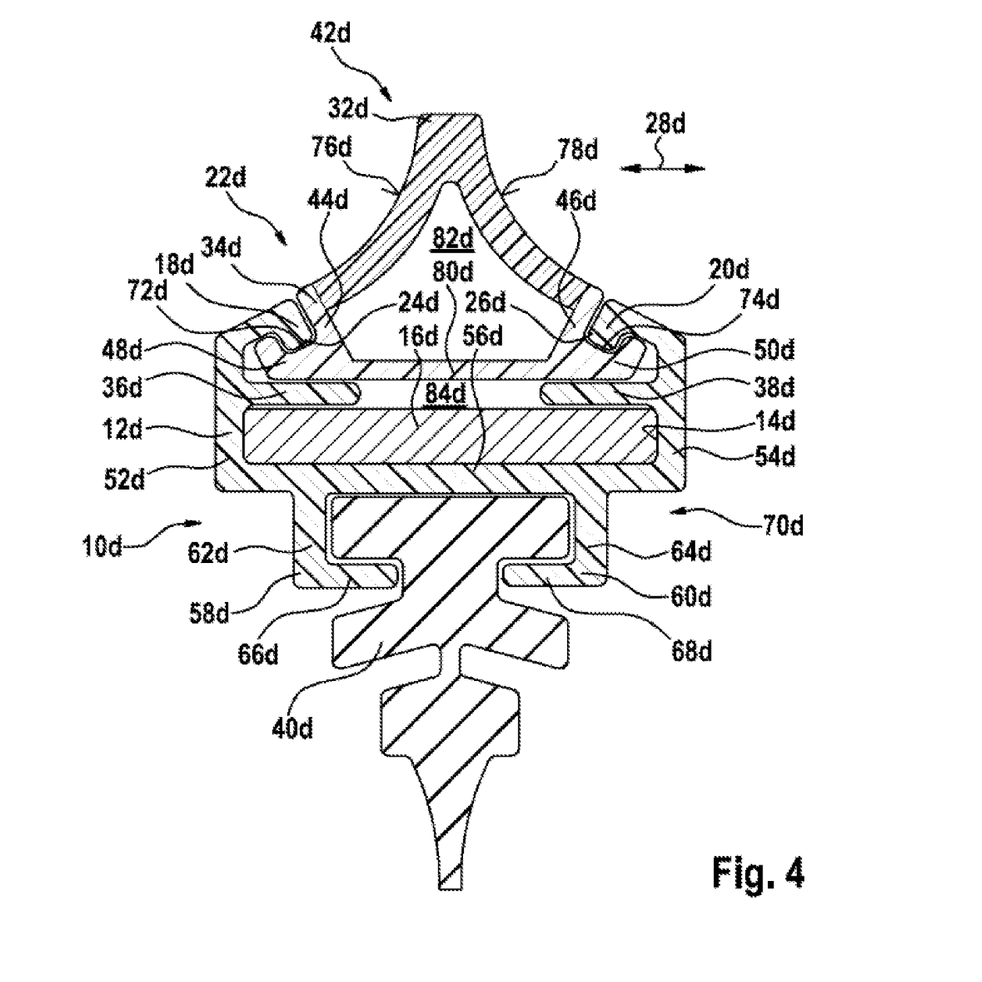
FIG. 4 shows a sectional illustration of a further exemplary embodiment of a wiping device with a retaining unit.

FIG. 4 shows a further exemplary embodiment of a wiping device according to the invention comprising a retaining unit 10d with a retaining element 12d which has a longitudinal guide channel 14d for guiding a spring element 16d, in a sectional illustration. The section plane runs perpendicularly to a longitudinal direction of the retaining element 12d. The wiping device shown substantially corresponds to the exemplary embodiment shown in FIG. 2. A width of a first spoiler subelement 32b corresponds to the width of the fastening webs 44d, 46d. The first spoiler subelement 32d converges in a rounded manner in an end region 42d facing away from a wiper strip 40d.

Figure 5:
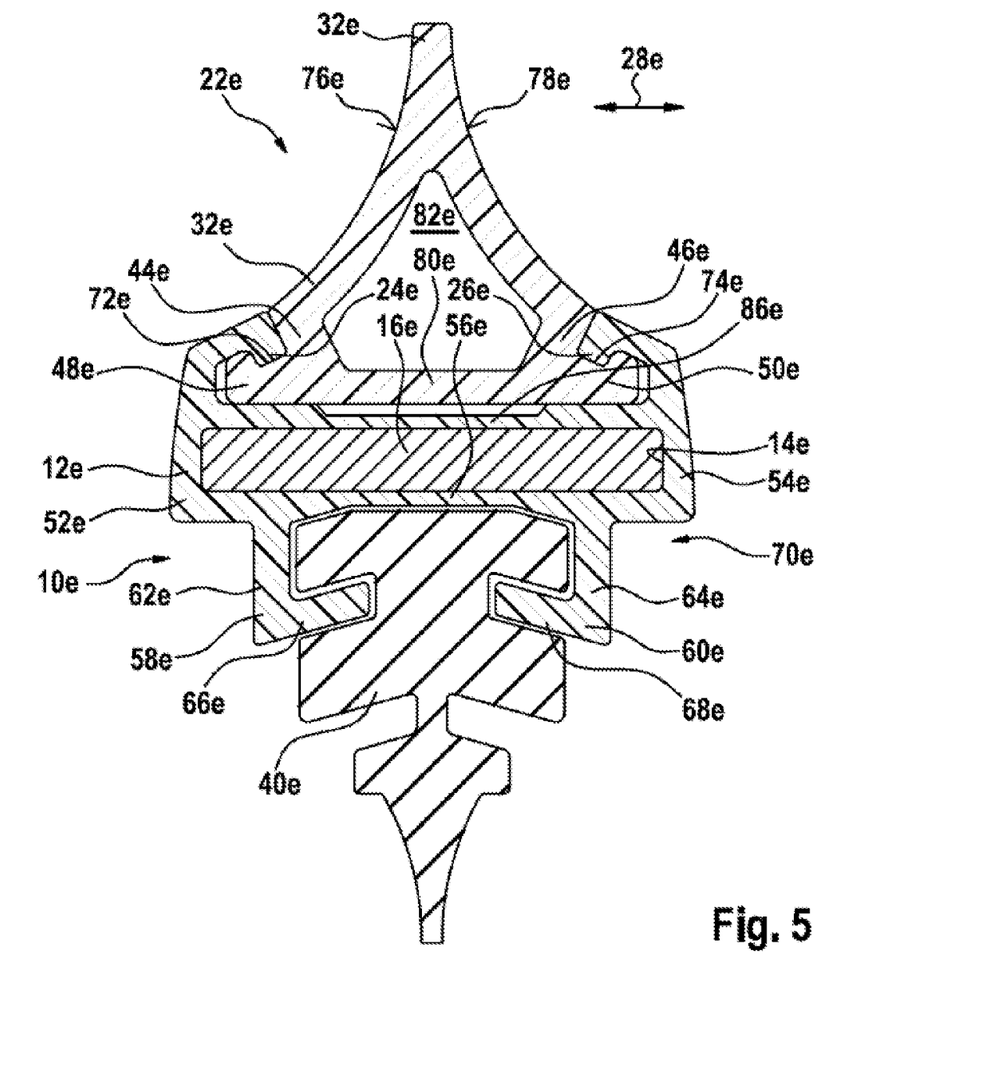
FIG. 5 shows a sectional illustration of a further exemplary embodiment of a wiping device with a retaining unit.

FIG. 5 shows a wiping device according to the invention comprising a retaining unit 10e with a retaining element 12e which has a longitudinal guide channel 14e for guiding a spring element 16e, and a spoiler unit 22e, in a sectional illustration. The section plane runs perpendicularly to a longitudinal direction of the retaining element 12e.

For the guidance of the spring element 16e, the longitudinal guide channel 14e has side walls 52e, 54e. Furthermore, an intermediate wall 56e which ends the longitudinal guide channel 14e in the direction of a wiper strip 40e is arranged on the side walls 52e, 54e. The side walls 52e, 54e extend from the intermediate wall 56e in a direction facing away from the wiper strip 40e. A second intermediate wall 86e ends the longitudinal guide channel 14e in the direction of the spoiler unit 22e. The longitudinal guide channel 14e is therefore completely enclosed. A respective fastening means 18e, 20e which, with a respective free end 24e, 26e, faces the longitudinal guide channel 14e is integrally formed on the side walls 52e, 54e. The fastening means 18e, 20e are of L-shaped design and border the side walls 52e, 54e at an obtuse angle of 60°.

Two guide profiles 58e, 60e of the retaining unit 10e are arranged on the intermediate wall 56e. The guide profiles 58e, 60e are formed in one piece with the retaining element 12e. The guide profiles 58e, 60e each have a side guide 62e, 64e and each have a vertical guide 66e, 68e. The vertical guides 66e, 68e each enclose an acute angle of 77° with the side guides 62e, 64e. The vertical guides 66e, 68e here point toward each other. The side guides 62e, 64e each enclose an angle of 90° with respect to the intermediate wall 56e. The free ends of the guide profiles 58e, 60e point toward the vertical guides 66e, 68e in directions facing each other. The guide profiles 58e, 60e and the intermediate wall 56e form a beading rail 70e into which the wiper strip 40e is inserted.

The spoiler unit 22e is produced in an extrusion process and has a spoiler subelement 32e. The spoiler subelement 32e has two outwardly concavely formed spoiler sides 76e, 78e. In order to reinforce the spoiler unit 22e, the spoiler subelement 32e has a connecting web 80e which connects the concave spoiler sides 76e, 78e to each other. The connecting web 80e and the spoiler sides 76e, 78e bound a longitudinal channel 82e which has a substantially pentangular cross section.

The spoiler subelement 32e is provided for deflecting relative wind. The first spoiler subelement 32e has two fastening webs 44e, 46e which are formed in one piece with the connecting web 80e. The fastening webs 44e, 46e enclose an angle of 60° with the connecting web 80e. The spoiler subelement 32e has two fastening grooves 72e, 74e which each form an interlocking connection with the fastening means 18e, 20e.

The retaining element 12e is produced in one piece from polyethylene in an extrusion process. In this context, a person skilled in the art will take various plastics appearing expedient into consideration, such as, in particular, polypropylene, polyamide, polyvinyl chloride and/or polystyrene.

The free ends 24e, 26e of the fastening means 18e, 20e are enclosed by a second spoiler subelement 34e. The spoiler subelement 32e here bears in an interlocking manner against the fastening means 18e, 20e. The spoiler subelement 32e has two supporting bodies 48e, 50e which bear against the fastening means 18e, 20e and against the spring element 16e. The connecting web 80e connects the supporting bodies 48e, 50e to each other.

The spring element 16e is embedded in the longitudinal guide channel 14e. The spring element 16e is produced from a spring steel and is provided for forming the retaining unit 10e in an elastically deflectable manner.

For assembly, first of all the spring element 16e is inserted into the longitudinal guide channel 14e. Subsequently, the wiper strip 40e is pushed into the beading rail 70e and forms an interlocking connection with the retaining element 12e. The spoiler unit 22e is then pushed into the retaining element 12e and is then connected thereto in an interlocking manner.

What is claimed is:

1. A wiping device configured to move along a wiping direction (28), the wiping device comprising a retaining unit (10a-10e) which has a retaining element (12a-12e) with both a longitudinal guide channel (14a-14e) extending along a longitudinal direction for guiding a spring element (16a-16e), and guide elements (62a-62e, 62b-62e) for guiding a wiper lip (40a-40e), the wiping device also comprising a spoiler unit (22a-22e), characterized in that the retaining element (12a-12e) has at least one L-shaped fastening means (18a-18e, 20a-20e) having a free end (24a-24e, 26a-26e) that points toward the longitudinal guide channel (14a-14e) and forms an interlocking connection with the spoiler unit (22a-22e), wherein the at least one fastening means (18a-18e, 20a-20e) extends at an obtuse angle from at least one side wall (52a-52e, 54a-54e) of the retaining element (12a-12e), and wherein the longitudinal guide channel (14a-14e) is spatially positioned between the guide elements (62a-62e, 62b-62e) and the at least one fastening means (18a-18e, 20a-20e) along a direction of a vertical axis that is perpendicular to both the wiping direction (28) and the longitudinal direction, wherein the at least one side wall extends vertically along a direction parallel to the vertical axis, wherein the at least one L-shaped fastening means includes a first portion that extends directly from an upper end of the side wall (52a-52e, 54a-54e), and a second portion that extends substantially perpendicularly from the first portion and points toward the longitudinal guide channel, wherein an overall width of the retaining unit in the wiping direction is greater than an overall width of the spoiler unit in the wiping direction.

2. The wiping device as claimed in claim 1, characterized in that the retaining element (12b-12d) has at least one channel wall (36b-36d, 38b-38d) which is provided for transmitting press-on forces of the spoiler unit (22b-22d) to the retaining unit (10b-10d).

3. The wiping device as claimed in claim 1, characterized in that the spoiler unit (22a-22d) is produced in a coextrusion process.

4. The wiping device as claimed in claim 1, characterized in that the spoiler unit (22a-22d) has two spoiler subelements (32a-32d; 34a-34d) differing in hardness.

5. The wiping device as claimed in claim 4, characterized in that a harder spoiler subelement (34a-34d) bears in an interlocking manner against the fastening means (18a-18d, 20a-20d).

6. The wiping device at least as claimed in claim 4, characterized in that a softer spoiler subelement (32a-32e) bounds a longitudinal channel (82a-82e) which has a pentangular cross section.

7. The wiping device at least as claimed in claim 4, characterized in that a softer spoiler subelement (32a-32e) has at least one concavely formed spoiler side (76a-76e, 78a-78e).

8. A retaining unit (10a-10e) of a wiping device as claimed in claim 1.

9. The wiping device as claimed in claim 1, further comprising a wiper strip (40a-40d) interlocking with the guide elements (62a-62e, 62b-62e) of the retaining element (12a-12e).

10. The wiping device as claimed in claim 9, wherein the wiper strip is located on a side of the retaining element (12a-12e) opposite the spoiler unit (22a-22e).

11. The wiping device as claimed in claim 9, wherein the free end points toward the wiper strip.

12. The wiping device as claimed in claim 1, wherein the at least one L-shaped fastening means (18a-18e, 20a-20e) includes two L-shaped fastening means that extend inwardly toward one another along the wiping direction (28), and the at least one side wall includes two side walls that are parallel to one another and define opposite sides of the longitudinal guide channel (14a-14e) along the wiping direction (28).

13. The wiping device as claimed in claim 12, wherein a distance between the two side walls along the wiping direction is greater than the overall width of the spoiler unit in the wiping direction.

14. The wiping device as claimed in claim 1, wherein the first portion extends at an obtuse angle relative to the side wall.

15. The wiping device as claimed in claim 1, wherein the first portion and the second portion are the only elements that extend from the upper end of the side wall.

16. The wiping device as claimed in claim 1, wherein the side wall is elongate and extends linearly, and wherein the side wall includes both the upper end and a lower end spaced from the upper end along the direction parallel to the vertical axis.

* * * * *